United States Patent [19]

Minami

[11] Patent Number: 5,286,085
[45] Date of Patent: Feb. 15, 1994

[54] RESTRAINING PROTECTIVE SEAT FOR INFANTS

[75] Inventor: Yoshihiko Minami, Shiga, Japan

[73] Assignee: Takata Corporation, Tokyo, Japan

[21] Appl. No.: 962,083

[22] Filed: Oct. 16, 1992

Related U.S. Application Data

[63] Continuation of Ser. No. 655,371, Feb. 26, 1991, abandoned.

[30] Foreign Application Priority Data

Jun. 30, 1989 [JP] Japan .................................. 1-168713

[51] Int. Cl.$^5$ ................................................ A47C 1/08
[52] U.S. Cl. ............................. 297/250.1; 297/216.16
[58] Field of Search .............. 297/480, 479, 476, 816, 297/250, 325, 361, 460

[56] References Cited

U.S. PATENT DOCUMENTS

| | | | |
|---|---|---|---|
| 4,033,622 | 7/1977 | Boudreau | 297/250 |
| 4,208,770 | 6/1980 | Takada | 297/476 X |
| 4,500,133 | 2/1985 | Nakao et al. | 297/216 X |
| 4,552,407 | 11/1985 | Takada | 297/480 X |
| 4,591,208 | 5/1986 | McDonald et al. | 297/487 |

FOREIGN PATENT DOCUMENTS

| | | | |
|---|---|---|---|
| 270035 | 6/1988 | European Pat. Off. | 297/216 |
| 2752860 | 6/1978 | Fed. Rep. of Germany | 297/479 |
| 2553985 | 5/1985 | France | 297/250 |
| 235137 | 9/1988 | Japan | 297/250 |

*Primary Examiner*—Jose V. Chen
*Attorney, Agent, or Firm*—Armstrong, Westerman, Hattori, McLeland & Naughton

[57] ABSTRACT

A reclining adjustment mechanism (20) for continuously varying the reclining attitude of a seat main unit (2) of an infant restraining protective seat (1) is provided, and a protecting member (10), which does not allow a vehicle seat belt (7) to come into direct contact with the seat main unit (2) when the seat belt (7) is tightened, is interposed between the seat belt (7) and the seat main unit (2). Further, an engaging mechanism (2c, 10d, 11, 12), which causes the protecting member (10) and the seat main unit (2) to engage when the vehicle undergoes deceleration in excess of a predetermined value, is provided. Accordingly, the reclining attitude of the seat main unit can be adjusted continuously by the reclining adjusting mechanism. As a result, the seat belt does not directly engage the seat main unit (2) owing to the protecting member when an infant restraining protective seat is secured to the vehicle seat by the seat belt. Accordingly, the reclining attitude of the seat main unit can be adjusted continuously with the seat belt left in the tightened state. Since the protecting member and the seat main unit are engaged by the engaging mechanism when the vehicle undergoes a large amount of deceleration, a change in reclined attitude owing to movement of the seat main unit is reliably prevented.

6 Claims, 5 Drawing Sheets

RESTRAINING PROTECTIVE SEAT FOR INFANTS

This application is a continuation of application Ser. No. 07/655,371 filed Feb. 26, 1991 now abandoned.

DESCRIPTION

1. Technical Field

This invention relates to a restraining protective seat for infants placed on a seat of a vehicle such as an automobile and secured to the vehicle seat by a seat belt with which the vehicle seat is provided. More particularly, the invention relates to an infant restraining protective seat capable of being reclinably adjusted.

2. Background Art

In a vehicle such as an automobile, restraining protective seats for infants have been used in order to retain the sitting posture of an infant during travel and protect the infant from shock at the time of acceleration and deceleration. An infant restraining and protective seat of this kind is placed on a seat of the vehicle and is secured by a seat belt with which the vehicle seat is provided.

Among these infant restraining and protective seats, one of a reclining type has been developed in order to place an infant in a sleeping posture which will induce restful sleep when the infant is to sleep or in order to place the infant in a comfortable posture when the infant is relaxing.

FIG. 7 illustrates an example of such a common infant restraining protective seat capable of reclining. As is evident from FIG. 7, a restraining protective seat 1 for infants comprises a seat main unit 2 for seating an infant and a base 3 for supporting the infant in a reclinable manner. The mutually opposing surfaces of the seat main unit 2 and base 3 are curved surfaces that are arcuate in shape. The seat main unit 2 is adapted so as to be reclinable relative to the base 3 along these curved surfaces. A locking mechanism, not shown, which prevents relative movement between the seat main unit 2 and base 3 is controlled by an operating lever 4 to be placed in a locked state or an unlocked state, whereby the seat main unit 2 can be reclined to assume several reclining angles.

The main seat unit 2 is provided with an infant seat belt 5 comprising belts 5a for restraining the infant and a protective pad 5b. In this case, the seat main unit 2 is provided, at several locations in the vertical direction, with holes 2a through which the infant seat belt 5 is passed. This makes it possible to adjust the height of the infant seat belt 5 over several stages in conformity with the size of the infant.

As shown in the same figure, the infant restraining protective seat 1 thus constructed has its base 3 placed upon a vehicle seat 6, and a seat belt 7 with which the vehicle seat 6 is provided it tightened upon being passed through a mounting hole 8 or a mounting hole 9 formed in the seat main unit 2, thereby fixing the restraining protective seat 1 to the vehicle seat 6.

However, when the seat main unit 2 is made to recline from the presently set reclining angle to another angle in such a conventional infant restraining protective seat, this is performed in stages and therefore the seat main unit 2 cannot be set at any desired reclining position while the seat belt 7 is in a tightened state.

In addition, the infant restraining protective seat 1 is subjected to a large inertial force when the vehicle undergoes deceleration in excess of a predetermined value. As a result, the seat main unit 2 moves and a change is produced in the reclining attitude of the infant restraining protective seat 1. In order to prevent such a change in reclining attitude due to movement of the seat main unit 2 at the time of great deceleration, the reclining mechanism is inevitably large in size and complicated in structure. Accordingly, the infant restraining protective seat 1 is troublesome to handle.

The present invention has been devised in view of these problems and its object is to provide a restraining protective seat for infants in which reclining attitude can be changed in continuous fashion.

Another object of the present invention is to provide a restraining protective seat for infants in which the reclining adjusting mechanism is made comparatively simple in structure while the reclining attitude can be held with assurance, even at the time of great deceleration.

DISCLOSURE OF THE INVENTION

In order to attain the foregoing objects, a restraining protective seat for infants according to the present invention is characterized in that there is provided a reclining adjusting mechanism which continuously changes the reclining attitude of the seat main unit of the infant restraining protective seat. Further, the protective seat is characterized in that a protecting member, which does not allow the seat belt to come into direct contact with the seat main unit when the seat belt is tightened, is interposed between the seat belt of the vehicle and the seat main unit. Furthermore, the protective seat is characterized by having an engaging mechanism which causes the protecting member and the seat main unit to engage when the vehicle undergoes deceleration in excess of a predetermined value.

In the restraining protective seat for infants according to the present invention having such a construction, the reclining attitude of the seat main unit is capable of being adjusted continuously by the reclining adjusting mechanism. This makes it possible for a desired reclining attitude to be freely set.

In this case, the arrangement is such that when the infant restraining protective unit has been secured to the vehicle seat by tightening the seat belt, the seat belt will not directly contact the seat main unit owing to the protecting member, and therefore the seat main unit can be reclined with the seat belt left in the tightened state.

When a large inertial force acts upon the restraining protective seat for infants owing to a large amount of vehicle deceleration, the protecting member and the seat main unit are caused to engage, thereby preventing sliding of the seat main unit. This makes it possible to reliably prevent a change in the reclining attitude of the restraining protective seat at the time of great deceleration.

BRIEF DESCRIPTION OF THE DRAWINGS

FIG. 4(a) and FIG. 4(b) are sectional views taken along line IV—IV of FIG. 3, in which FIG. 4(a) is a sectional view showing the state which prevails under ordinary conditions and FIG. 4(b) plastically is a sectional view showing the state which prevails under great deceleration;

BEST MODE FOR CARRYING OUT THE INVENTION

Figure 1A:
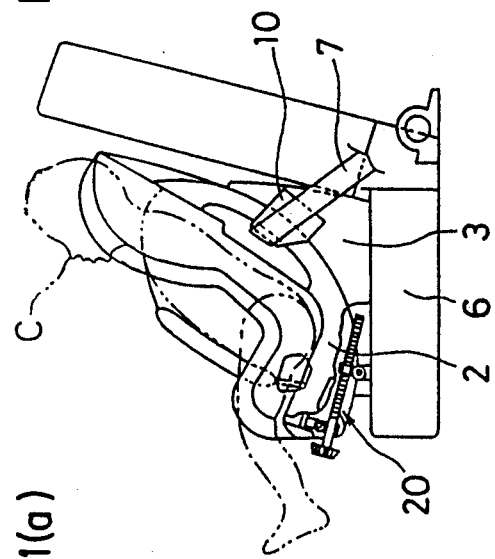
FIG. 1(*a*), FIG. 1(*b*) and FIG. 1(*c*) illustrate an embodiment of a restraining protective seat for infants according to the present invention, in which FIG. 1(*a*) is a side view showing an infant in a seated posture, FIG. 1(*b*) a side view showing the infant in a comfortable reclining posture and FIG. 1(*c*) a side view showing the infant in a sleeping posture.
Figure 1B:
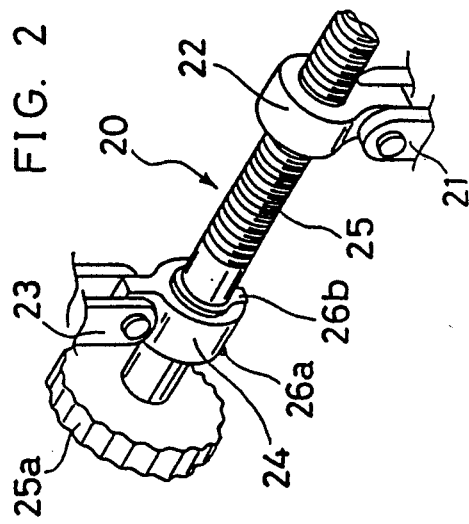
Figure 1C:
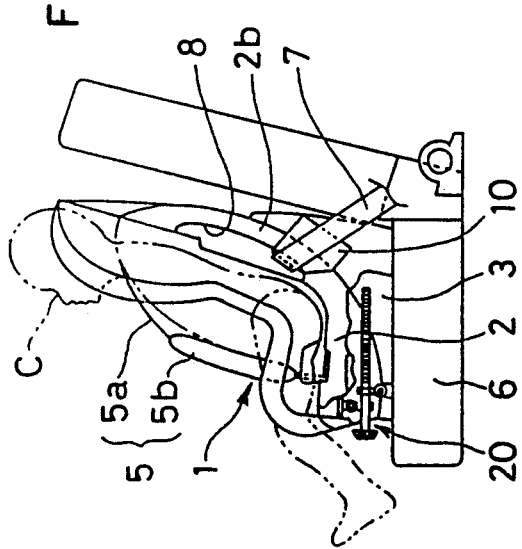
Figure 2:
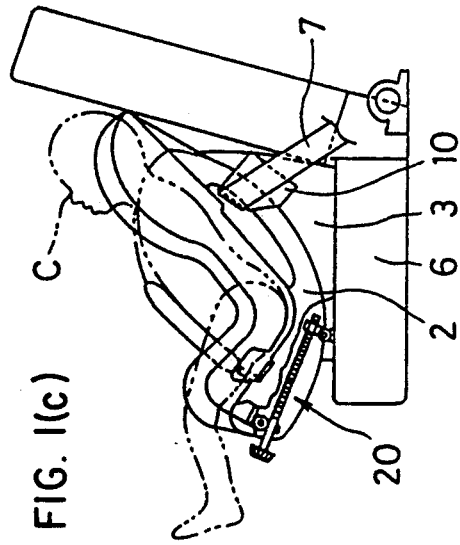
FIG. 2 is a partially enlarged view showing a reclining adjusting mechanism.

As shown in FIG. 1(a), FIG. 1(b) and FIG. 1(c), a reclining adjusting mechanism 20 for continuously reclining the seat main unit 2 of the infant restraining protective seat 1 is provided between the seat main unit 2 and the base 3. As illustrated in FIG. 2, the reclining adjusting mechanism 20 comprises a base-side bracket 21 secured to the base 3, a nut 22 rockably supported on the bracket 21, a seat main unit-side bracket 23 secured to the seat main unit 2, a support member 24 rockably supported on the bracket 23, and a screw rod 25, which has a knob 25a at its distal end, meshing with the nut 22 and supported on the support member 24 so as to be free to turn relative thereto. A pair of rings 26a, 26b are attached to the screw rod 25 so as to embrace the support member 24. The support member 24 and screw rod 25 are prevented by the rings 26a, 26b from undergoing relative movement in the axial direction. Accordingly, the arrangement is a worm gear mechanism which moves the nut 22 such that the seat main unit 2 is moved continuously relative to the base 3 by grasping the knob 25a and turning the screw rod 2.

The infant restraining protective seat 1 thus constructed is placed upon the seat 6 of a vehicle such as an automobile, and the seat belt 7 with which the seat 6 is provided is passed through the mounting hole 8 of the seat main unit 2 and then tightened, thereby retaining and securing the protective seat, just as in the prior art. In this case, however, in accordance with this embodiment, a protector 10 serving as the protecting member of the present invention is interposed between the seat belt 7 and the seat belt setting portion 2b of the seat main unit 2.

Figure 3:
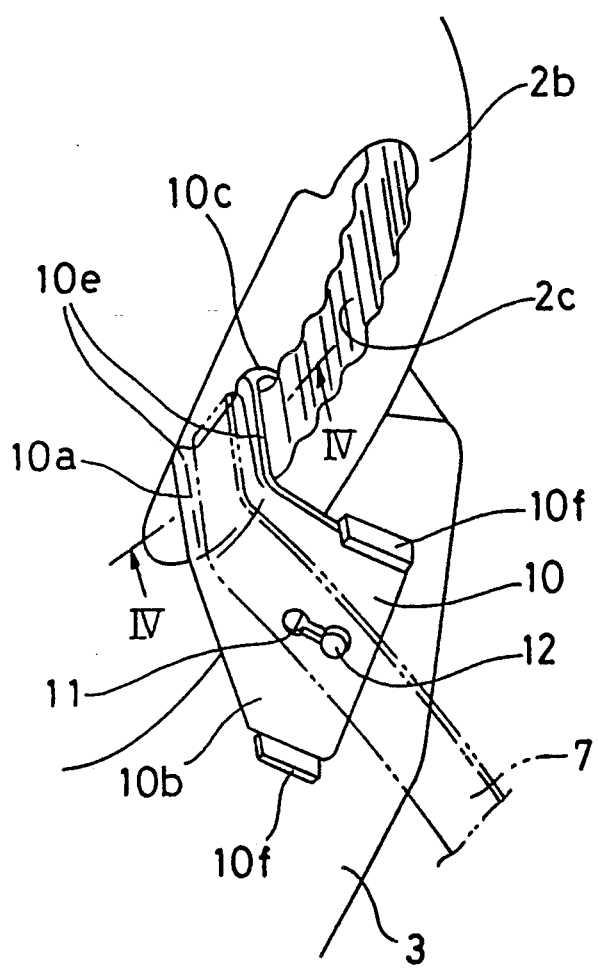
FIG. 3 is a partially enlarged perspective view showing the vicinity of a seat belt setting portion in the restraining protective seat for infants.

As illustrated in FIG. 3, the protector 10 is formed to have a substantially C-shaped cross section and includes a central portion 10a and a pair of left and right side portions 10b, 10c extending substantially at right angles from left and right ends of the central portion 10a. Each of the pair of side portions 10b, 10c is formed to have a mounting hole 11. As is evident from FIG. 4(a), the mounting hole 11 includes a pair of small circular holes 11a, 11b and a linear hole or slot of smaller width 11c connecting these small circular holes 11a, 11b. The base 3 is provided on its left and right side portions with a pair of upstanding pins 12 (the pin on the right side is not shown). The protector 10 is passed through the mounting hole 8 of the seat main unit 2 so as to embrace the seat belt setting portion 2b. Of the pair of mounting holes 11a, 11b of the side portions 10b, 10c, the holes 11a nearest the edges are mated with the pins 12, thereby attaching the protector 10 to the base 3. In this case, the diameter of each pin 12 is set to be slightly larger than the width of the linear hole or slot 11c, and hence the arrangement is such that the pin 12 is incapable of passing through the linear hole 11c when acted upon by an ordinary force. However, the arrangement is such that if a force greater than a predetermined value acts upon the pin 12, then the pin 12 will cause the portion forming the linear hole 11c of the protector 10 to undergo plastic deformation, as depicted in FIG. 4(a), as a result of which the pin is capable of moving to the other hole 11b by passing through the linear hole 11c.

Figure 4B:
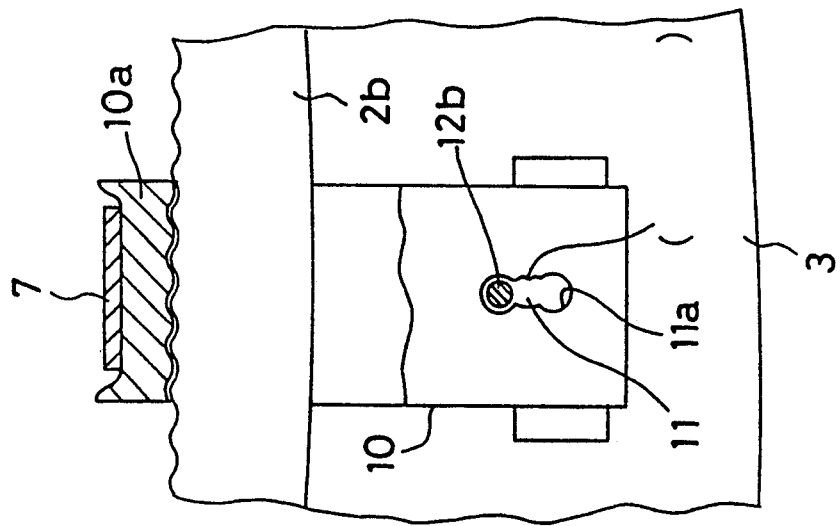

Further, as shown in (a) of FIG. 4, the seat belt setting portion 2b of the seat main unit 2 and the central portion 10a of the protector are formed to have identically shaped corrugated surfaces 2c, 10d, respectively, on their mutually opposing surfaces. The corrugated surfaces 2c, 10d are so arranged as to having a prescribed gap a between them under ordinary conditions in which the pin 12 is penetrating the hole 11a on the edge side of the protector 10. The arrangement is such that when the pin 12 is moved to the other hole 11b upon being subjected to a force greater than a predetermined value, the two corrugated surfaces 2c, 10d mesh with each other, as illustrated in FIG. 4(b). When the two corrugated surfaces 2c, 10d are in the meshed state, the seat main unit 2 is prevented from moving relative to the base 3 in the reclining direction, and therefore a change in the reclining attitude is prevented. In other words, an engaging mechanism according to the invention is constructed by the corrugated surfaces 2c, 10d, the mounting hole 11 and the pin 12.

Figure 4A:
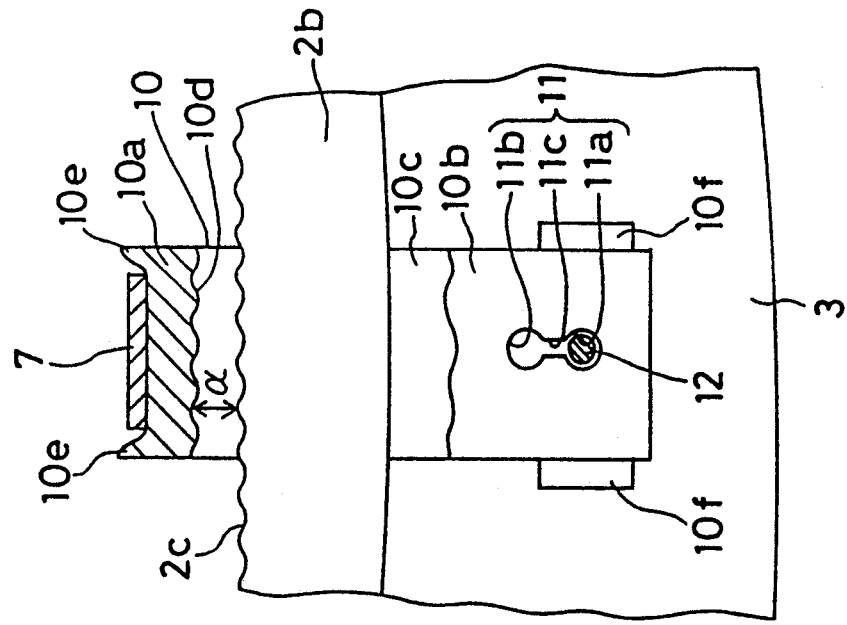

Furthermore, as is evident from FIG. 3 and FIG. 4(a), both edges of the central portion of protector 10 are formed to have a pair of guides 10e, 10e by which the seat belt 7 is prevented from slipping off the central portion 10 of the protector. In addition, the side portions 10b, 10c of protector 10 are also provided with a pair of edge guides 10f, 10f, respectively. These similarly prevent the seat belt 7 from slipping off the protector 10.

Next, a case will be described in which the infant restraining protective seat 1 of the embodiment is mounted on the seat 6 of a vehicle such as an automobile.

Figure 7:
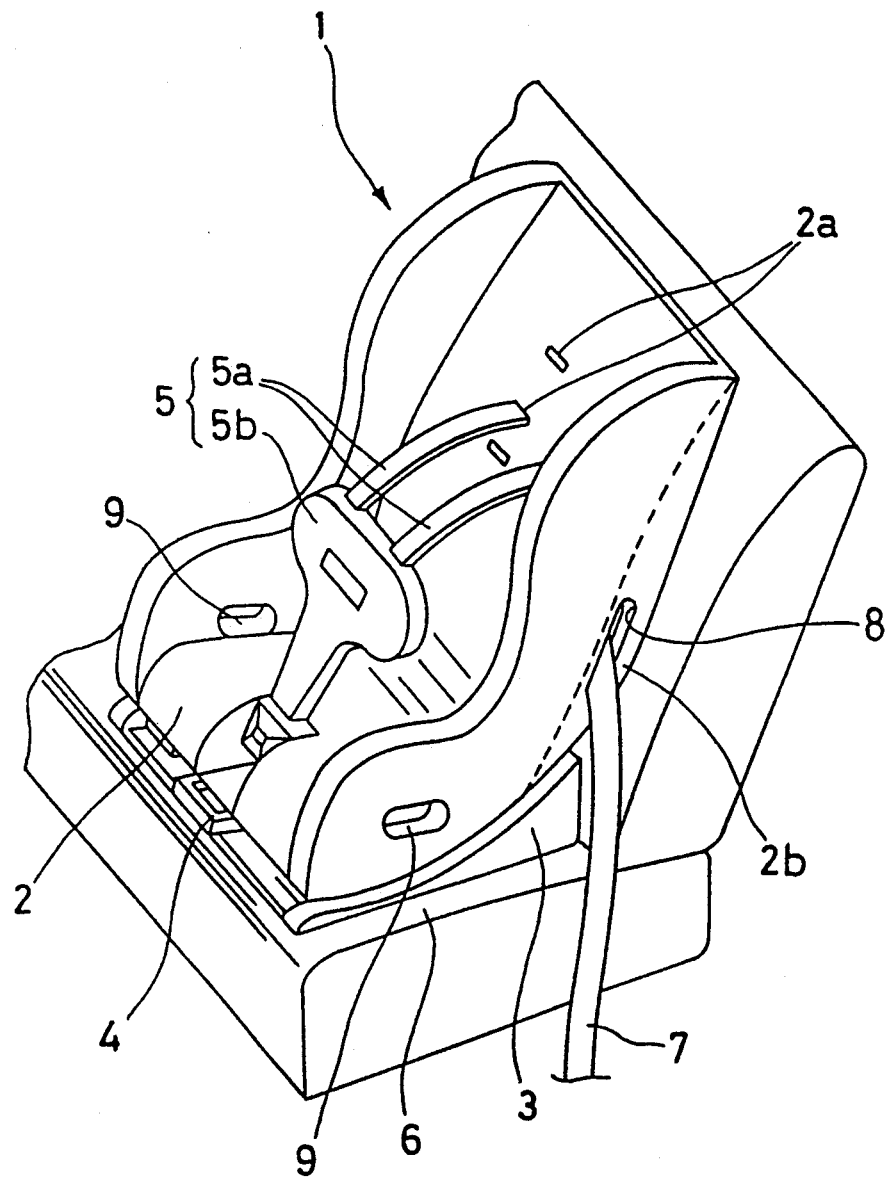
FIG. 7 is a perspective view showing an example in which an ordinary constraining protective seat for infants is attached to a vehicle seat.

First, in a case where the infant restraining protective seat 1 is to be mounted on the vehicle seat 6 facing forwardly, the protective seat 1 is placed upon the vehicle seat 6 and the seat belt 7 provided on the seat 6 is passed through the mounting hole 8, just as in the prior art of FIG. 7, and the seat belt 7 is then tightened in such a manner that it comes to be situated between the pair of guides 10e, 10e of the central portion 10a of the protector. As a result, the infant restraining protecting seat 1 is firmly secured to the vehicle seat 6. In this case, the seat belt 7 engages the protector 10, as shown in FIG. 3, but it in no way engages the seat main unit 2. Accordingly, the tightening force of the seat belt 7 is transmitted to the base via the protector 10 and pin 12.

The operation of this embodiment will now be described.

If an infant C is to be seated in a sitting attitude once the infant restraining protective seat 1 has been mounted to the vehicle seat 1, the knob 25a is grasped, the screw rod 25 is turned in a direction which will cause the rod to be pulled in, and the seat main unit 2 is set to the reclining angle for the sitting attitude shown in FIG. 1(a). Next, the infant C is seated in the infant restraining protective seat 1 and the infant C is retained by the infant seat belt 5 of the protective seat 1. Thus, the infant C is restrained in the protective seat 1 in the sitting attitude.

When the infant C becomes tired and it is desired to place the infant in a more comfortable attitude, the knob 25a is grasped, the screw rod 25 is turned in the opposite direction which will cause the rod to protrude, and the seat main unit 2 is set at the desired reclining angle for the comfortable attitude shown in FIG. 1(b) while the infant C remains seated. In this case, the seat belt 7 of the vehicle does not engage the seat main unit 2, and therefore the seat main unit 2 can readily be reclined while the seat belt 7 is left in the tightened state. Moreover, the nut 22 meshing with the screw rod 25 and the support member 24 freely rotatably supporting the screw rod 25 both undergo pivoting motion in conformity with turning of the screw rod 25 as the attitude of the seat main unit 2 changes. In addition, the reclining attitude of the seat main unit 2 changes in a continuous manner. Thus, the infant C assumes a more comfortable attitude and can relax.

When the infant C falls asleep and it is desired to place the infant in an attitude for sleeping, the knob 25a is similarly grasped, the screw rod 25 is turned further in the opposite direction that will cause the rod to protrude further, and the seat main unit 2 is set at the desired reclining angle for the sleeping attitude shown in FIG. 1(c) while the infant C remains asleep. In this case also, the seat belt 7 of the vehicle does not engage the seat main unit 2, and therefore the seat main unit 2 can readily be reclined while the seat belt 7 is left in the tightened state. Moreover, owing to the pivoting motion of the nuts 22, 24, the screw rod 25 turns smoothly. The reclining attitude of the seat main unit at this time also changes in continuous fashion. Thus, the infant C assumes an attitude for sleeping and is capable of sleeping comfortably.

When the vehicle undergoes ordinary deceleration during ordinary traveling of the vehicle, the infant restraining protective seat 1 attempts to move forwardly owing to this inertial force. However, since the inertial force is not that great, the seat main unit 2 is held at the set reclining angle by the reclining adjusting mechanism 20 and the reclining attitude does not change. In this case, the pin 12 does not plastically deform the linear hole 11c of the protector 10 and does not move to the other hole 11b. Thus, the pin is held in the state shown in FIG. 4(a).

When the vehicle undergoes deceleration in excess of a predetermined value, the inertial force which attempts to move the infant restraining protective seat 1 in the forward direction increases. Consequently, the pin 12 plastically deforms the portion of protector 10 having the linear hole 11c and moves to the other hole 11b. Owing to this movement of pin 12 to the other hole 11b, the corrugated surface 10d of the central portion 10a of the protector and the corrugated surface 2c of the seat belt setting portion 2b in the seat main unit 2 mesh with each other so that the state shown in FIG. 4(b) is established. Even though the seat main unit 2 attempts to move relative to the base 3 in the reclining direction, in this state the movement of the seat main unit 2 is impeded by the meshing of the two corrugated surfaces 2c, 10d.

Instead of the slip impeding means using the meshing mechanism of the two corrugated surfaces 2c, 10d, the means for impeding relative movement of the seat main unit 2 can be constructed as slip stopping means in which a slip stopping member comprising a high-friction material such as rubber is fixedly provided on the surface of the central portion 10a of protector 10 that opposes the seat belt setting portion 2, with use being made of the frictional engagement between this slip stopping member and the seat belt setting portion 2b.

Furthermore, in order to engage the protector 10 and seat belt setting portion 2b when the vehicle undergoes a large deceleration, a spring which elastically deforms when acted upon by a force greater than a predetermined value may be utilized instead of the plastic deformation of the protector 10 as means for relatively moving the protector and the seat belt setting portion. In addition, it can be so arranged that the protector 10 and seat belt setting portion 2b are engaged owing to deformation of the protector 10 itself at the time of great deceleration.

Figure 5:
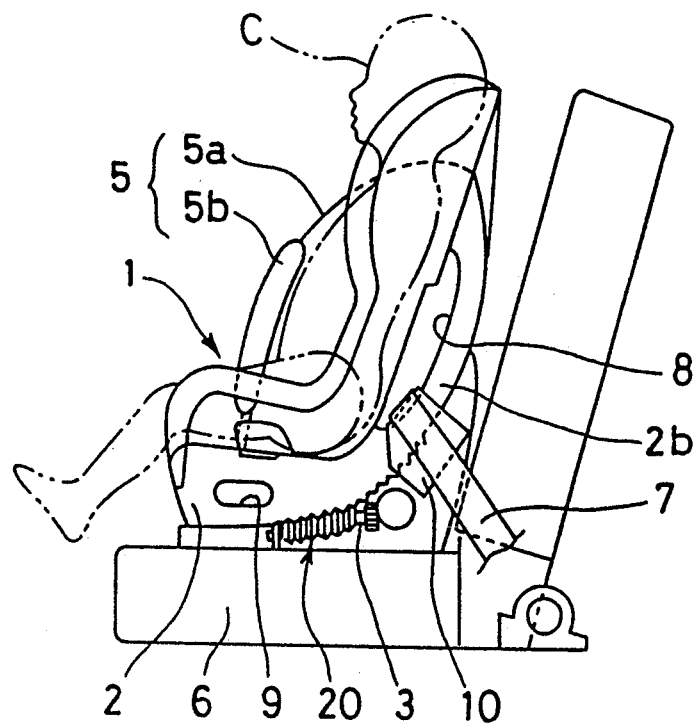
FIG. 5 is a side view, similar to that of FIG. 1(a), showing another embodiment of the present invention.

FIG. 5 is a diagram, similar to that of FIG. 1, illustrating another embodiment of the present invention. Components identical with those of the foregoing embodiment are designated by like reference characters and a description thereof is deleted.

Figure 6:
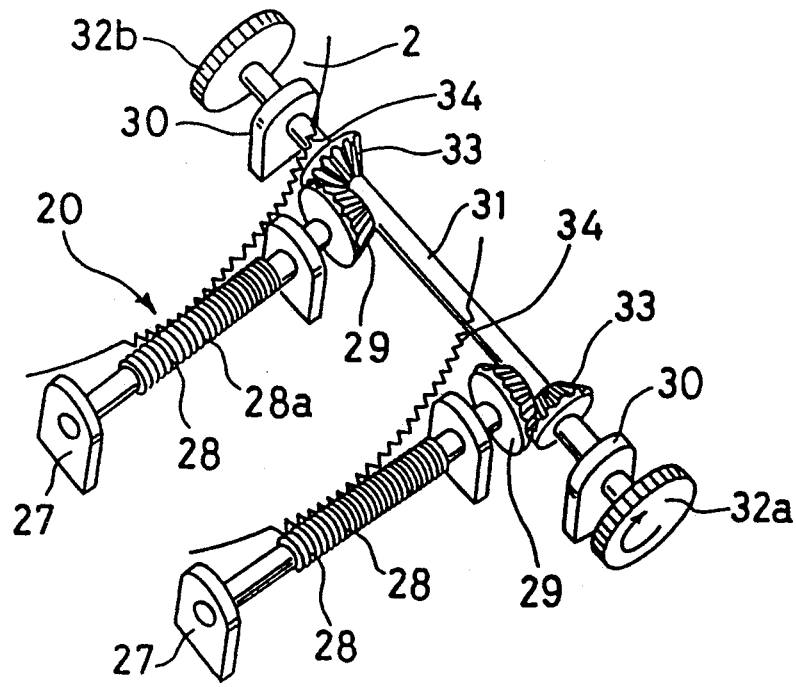
FIG. 6 is a partially enlarged view showing a reclining adjusting mechanism of this embodiment.

In this embodiment, as illustrated in FIG. 5, the reclining adjusting mechanism 20 is constituted by a worm gear mechanism. As illustrated in detail in FIG. 6, a pair of worm gears 28, 28 are freely rotatably provided on the base 3 via a pair of brackets 27, 27, and bevel gears 29, 29 are provided on one end of the respective worm gears 28. An operating shaft 31 is freely rotatably provided, in a direction perpendicular to the worm gears 28, on the base 3 via a pair of brackets 30, 30. The ends of the operating shaft 31 are provided with operating knobs 32a, 32b. Further, the operating shaft 31 is provided with a pair of bevel gears 33, 33. The bevel gears 33 mesh with respective ones of the bevel gears 29 corresponding to the worm gears 28. The seat main unit 2 is formed to have a pair of gears 34, 34 at positions corresponding to the pair of worm gears 28, 28. Accordingly, when the operating shaft 31 is turned by grasping one of the knobs 32a, 32b, the seat main unit 2 undergoes reclining motion via the bevel gears 33, 39 and worm gears 28. In this case also the reclining attitude of the seat main unit 2 changes in a continuous manner.

Industrial Applicability

The restraining protective seat for infants according to the present invention is applicable to a field in which such a protective seat is placed upon the seat of a vehicle such as an automobile and is fixed to the vehicle seat by a seat belt furnished on the vehicle seat, thereby restraining and protecting the infant.

What is claimed is:

1. A restraining protective seat for infants, comprising:
   a base placed upon a vehicle seat;
   a seat main unit supported on the base so as to be relatively movable continuously and independently from said base, and which is secured to said vehicle seat by passing a seat belt, with which said vehicle is provided, through mounting holes in said seat main unit, and then tightening said seat belt, wherein said mounting holes are formed in said seat main unit with a width greater than the width of said seat belt; and
   a continuously adjustable reclining adjustment mechanism for selectively and continuously adjusting a reclining attitude of said seat main unit to a desired reclined position, wherein said base and seat main unit have corresponding arcuately curved mating surfaces such that said seat main unit is movably supported on said base, and wherein said continuously adjustable reclining adjustment mechanism consists of a worm gear mechanism providing mechanical engagement between said seat main unit and said base such that operation of said worm gear mechanism moves said seat main unit at said mating surfaces to provide continuous adjustment of the reclining attitude of said seat main unit.

2. A restraining protective seat for infants according to claim 1, further comprising:

a protective member passing through said mounting holes in said seat main unit and positioned between an inside surface of said mounting holes in said seat main unit and said seat belt passing through said mounting holes which engages with said seat belt without directly contacting said seat main unit when said seat belt is tightened, and said protective member is supported on said base by supporting means.

3. A restraining protective seat for infants according to claim 2, wherein said supporting means comprises support pins mounted on both sides of said base, a slot with a width smaller than the diameter of said support pins, and a pair of engagement holes formed on both ends of said slot with diameters approximately the same as the diameter of said support pins, said protective member being supported by engaging said support pins with the engagement holes separated from said seat main unit, said protective member being provided with a first wave-like engagement surface facing said inside surface of said mounting holes in said seat main unit, said inside surface of said mounting holes in said seat main unit being provided with a second wave-like engagement surface engageable with said first wave-like engagement surface of said protective member;

said supporting means supporting said protective member with a gap $\alpha$ between said first wave-like engagement surface of said protective member and said second wave-like engagement surface of said seat main unit when deceleration of the vehicle is lower than a predetermined value;

said slot being deformed by relative displacement of said support pins from one said engagement hole to the other said engagement hole in said protective member when the deceleration of the vehicle is higher than the predetermined value, and said first and second wave-like engagement surfaces of said seat main unit and said protective mechanism being engaged with each other to block relative movement of said seat main unit in said reclining direction.

4. A restraining protective seat for infants according to claim 3, wherein said slot and said pair of engagement holes are provided on both sides of said protective member, said protective member having a substantially C-shaped cross-section, wherein said slot is provided from a rear end of said protective member toward said seat main unit.

5. A restraining protective seat for infants according to claim 3, wherein said first wave-like engagement surface of said protective member and said second wave-like engagement surface of said seat main unit are formed such that a plurality of crests and troughs forming said first and second wave-like engagement surfaces run in parallel to each other with a continuous wave-like shape, wherein said plurality of crests and troughs have a predetermined period, and wherein said plurality of crests and troughs extend in a direction perpendicular to a reclining direction of said seat main unit.

6. A restraining protective seat for infants according to claim 1, wherein said mounting holes are located within a back rest portion of said seat main unit in parallel with each other from one side of said vehicle to the other side.

* * * * *